United States Patent
Gomyo et al.

(10) Patent No.: US 6,939,047 B2
(45) Date of Patent: Sep. 6, 2005

(54) DYNAMIC PRESSURE BEARING DEVICE

(75) Inventors: Masato Gomyo, Nagano (JP); Noboru Ashibe, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 106 days.

(21) Appl. No.: 10/455,735

(22) Filed: Jun. 5, 2003

(65) Prior Publication Data

US 2003/0231813 A1 Dec. 18, 2003

(30) Foreign Application Priority Data

Jun. 11, 2002 (JP) ........................................ 2002-170619

(51) Int. Cl.[7] .............................................. F16C 32/06
(52) U.S. Cl. ...................................................... 384/107
(58) Field of Search ................................ 384/100, 107, 384/112, 113; 360/99.08, 98.07

(56) References Cited

U.S. PATENT DOCUMENTS

| | | | | |
|---|---|---|---|---|
| 3,399,000 A | * | 8/1968 | Remmers | 384/112 |
| 4,254,961 A | * | 3/1981 | Fersht et al. | 384/100 |
| 6,250,807 B1 | * | 6/2001 | Mori et al. | 384/100 |
| 6,361,214 B1 | * | 3/2002 | Ichiyama | 384/107 |
| 6,513,979 B2 | * | 2/2003 | Mori et al. | 384/107 |
| 2003/0230943 A1 | | 12/2003 | Tokunaga et al. | |

FOREIGN PATENT DOCUMENTS

CN 1060738 A 4/1992

\* cited by examiner

*Primary Examiner*—Thomas R. Hannon
(74) *Attorney, Agent, or Firm*—Hogan & Hartson, LLP

(57) ABSTRACT

A dynamic pressure bearing device includes a rotary shaft, a dynamic pressure bearing member for supporting the rotary shaft, two radial dynamic pressure bearing parts and a thrust dynamic pressure bearing part formed between the dynamic pressure bearing member and the rotary shaft, and a lubricating fluid continuously filled in the two radial bearing parts and the thrust bearing part. A bypass passage for pressure release is provided for communicating across the two radial dynamic pressure bearing parts to flow the lubricating fluid corresponding to the amount of the unbalance caused by the unbalance of the pumping effect forces from a high-pressure side to a low-pressure side through the bypass passage to reduce the unbalance.

18 Claims, 7 Drawing Sheets

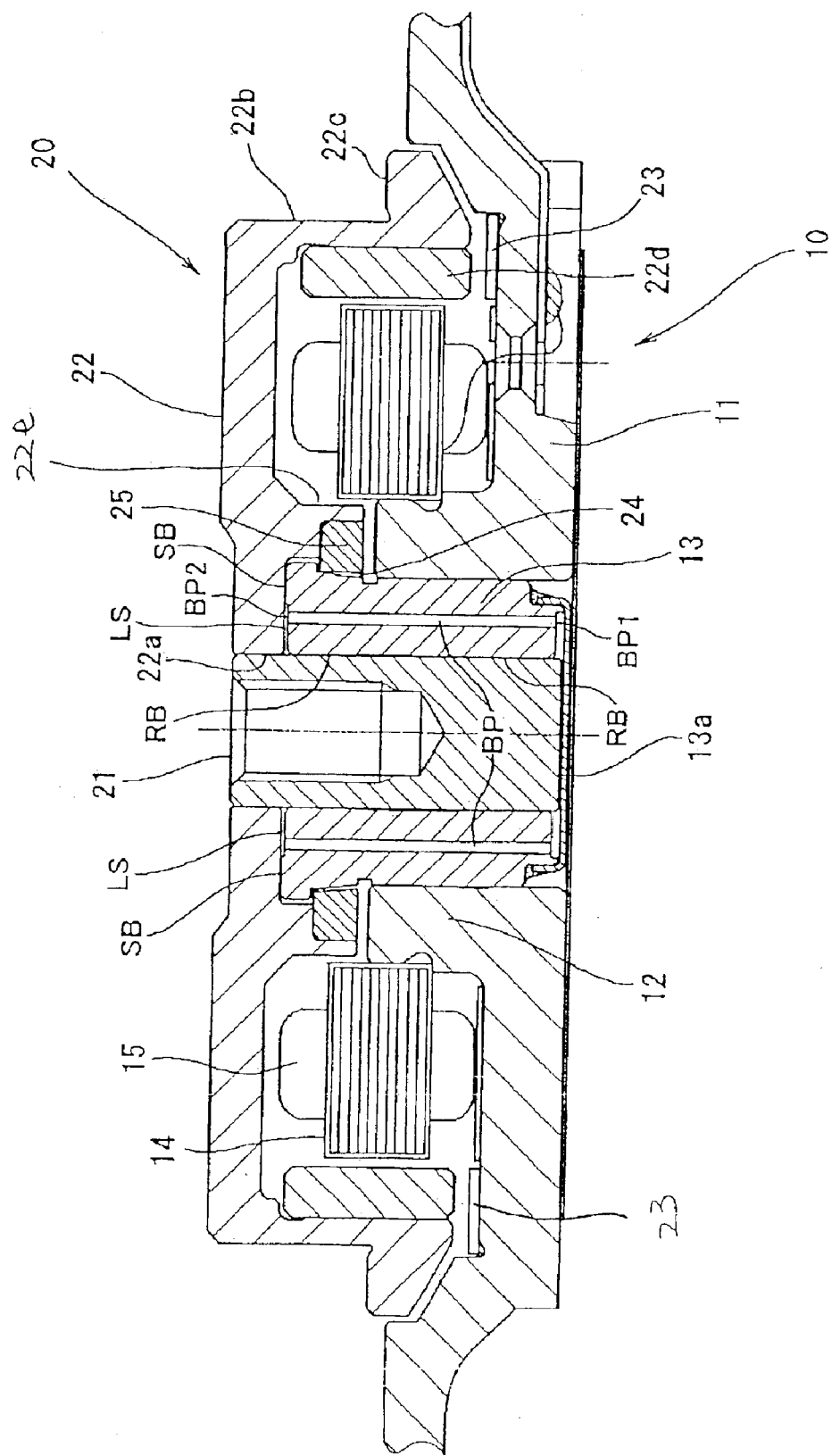
[Fig. 1]

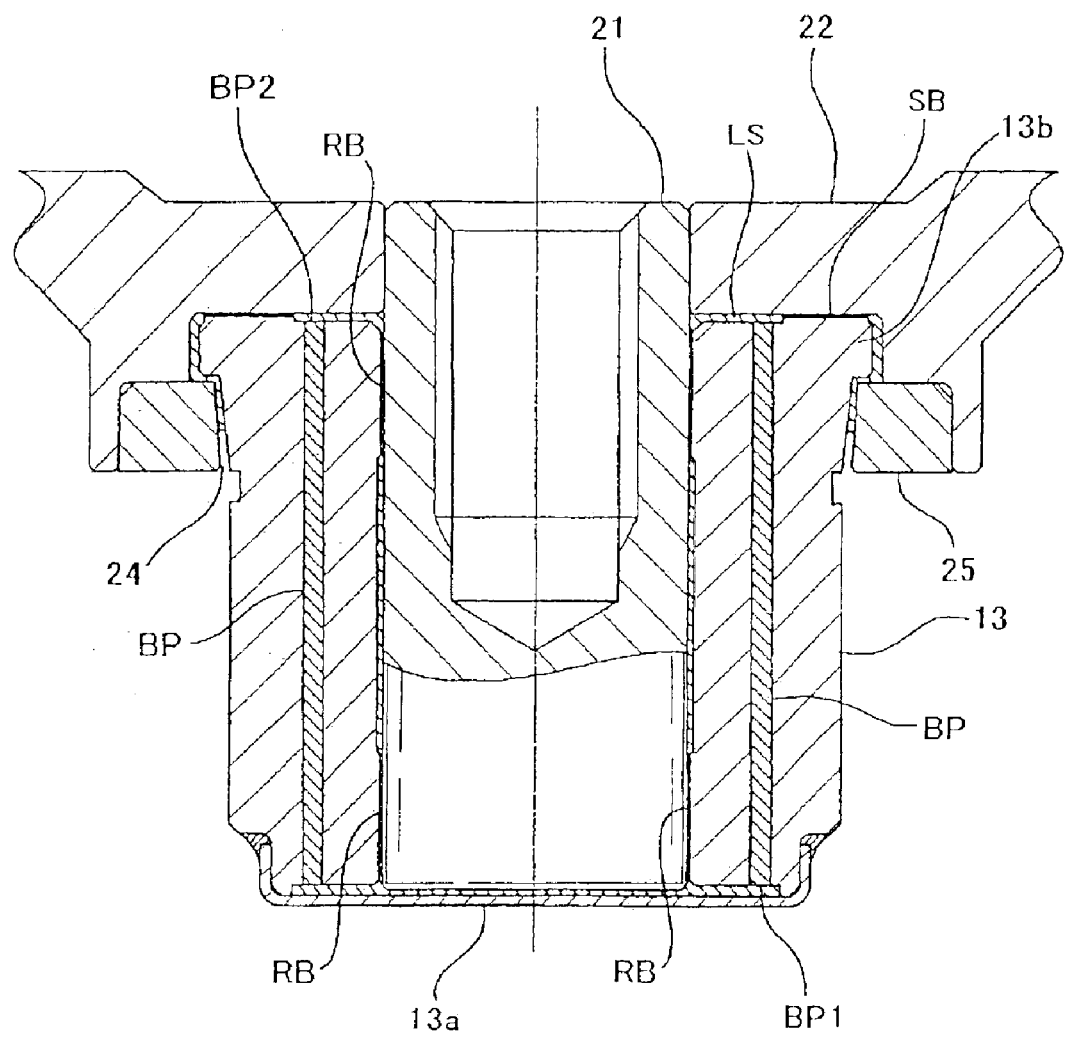
[Fig. 2]

[ Fig. 3 ]
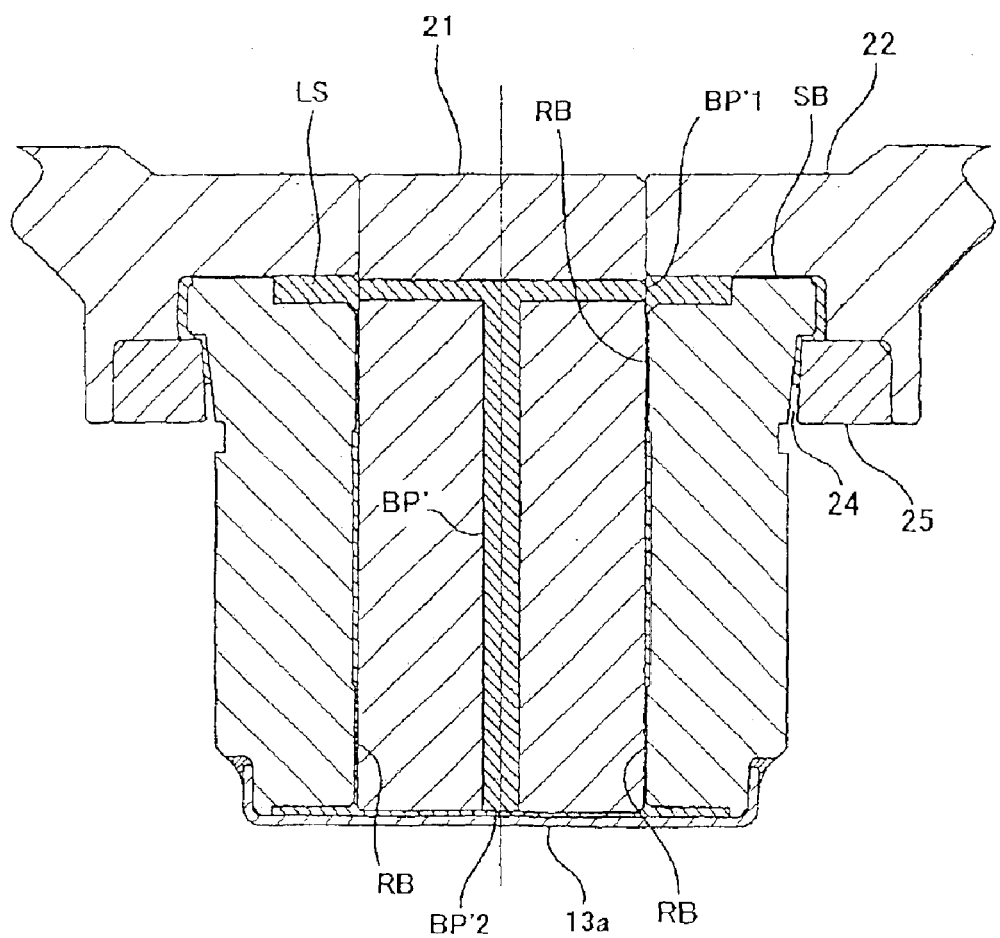

[Fig. 4]
Prior Art
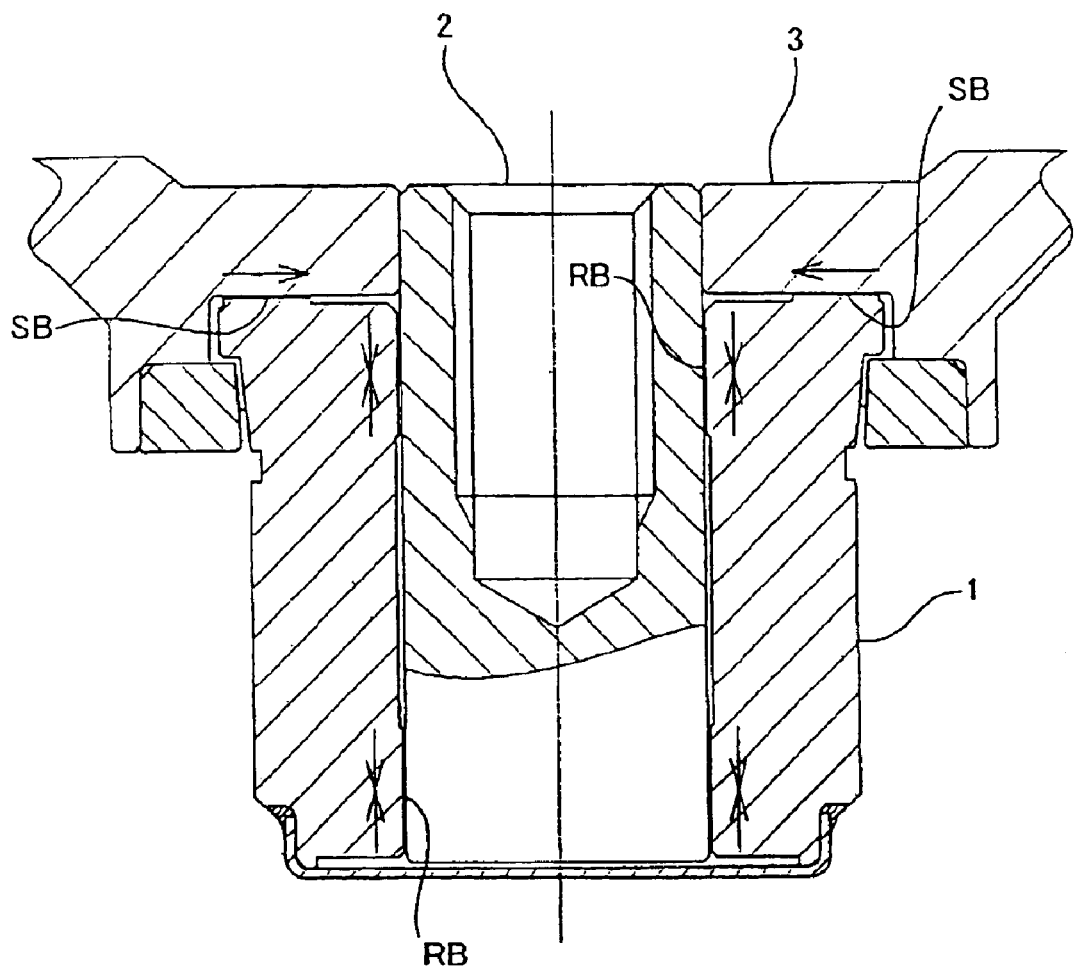

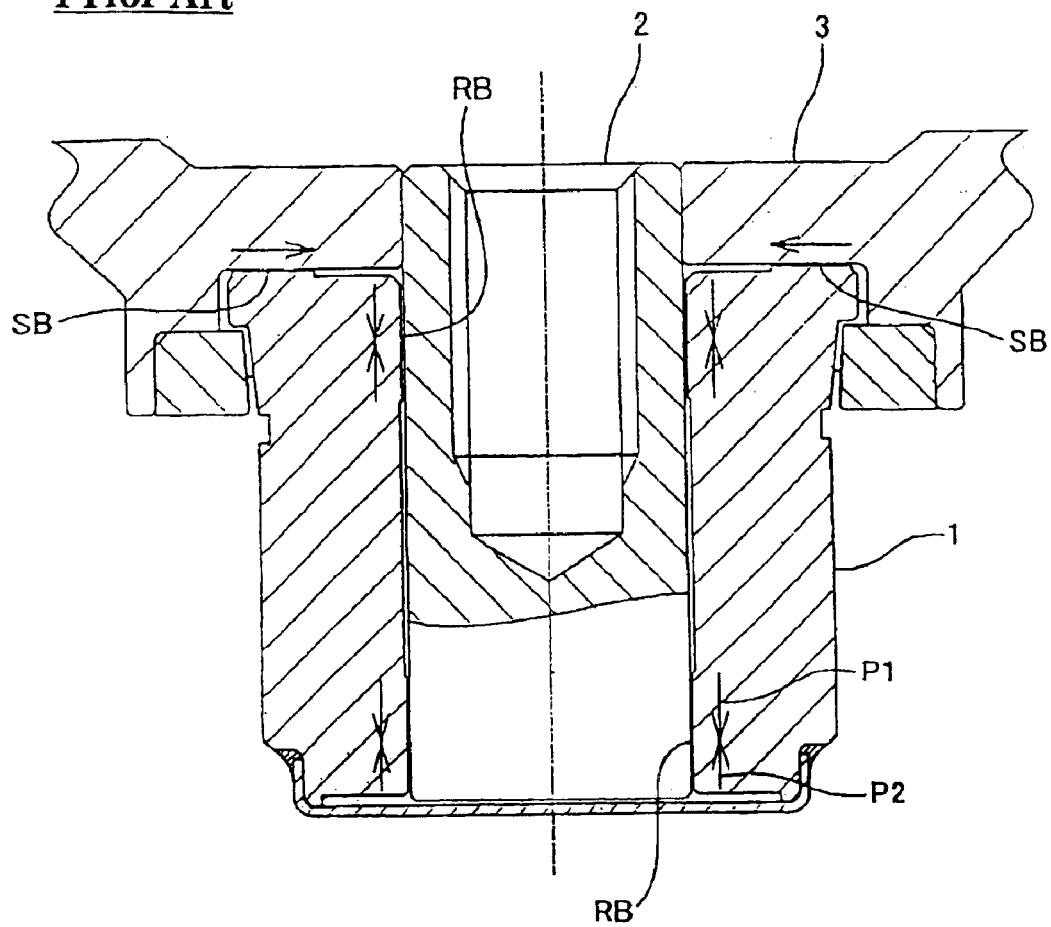
[Fig. 5]
Prior Art

[Fig. 6]
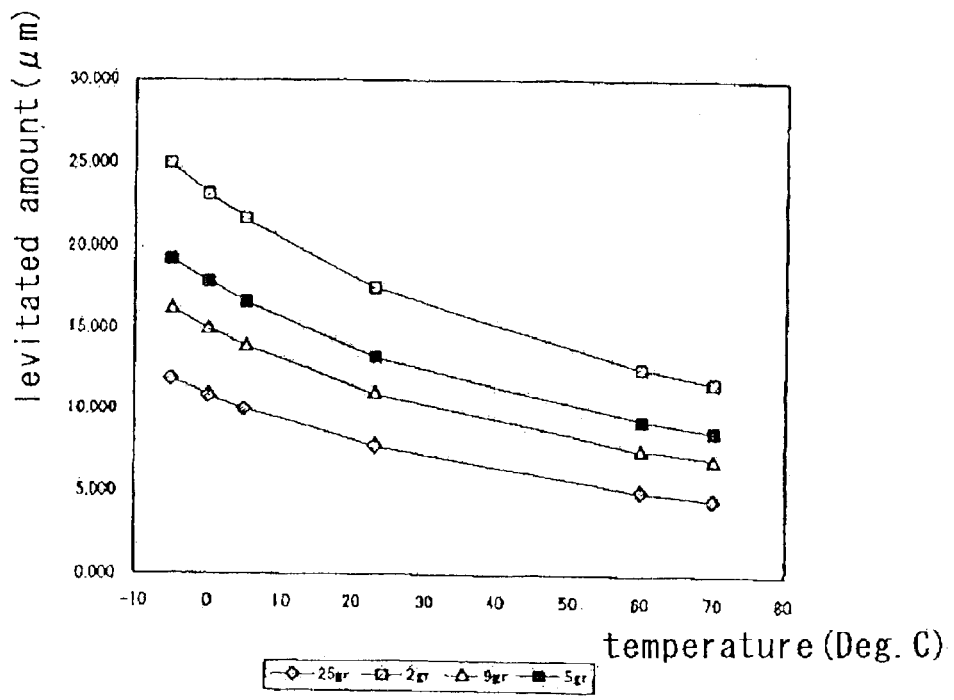
[Fig. 7]
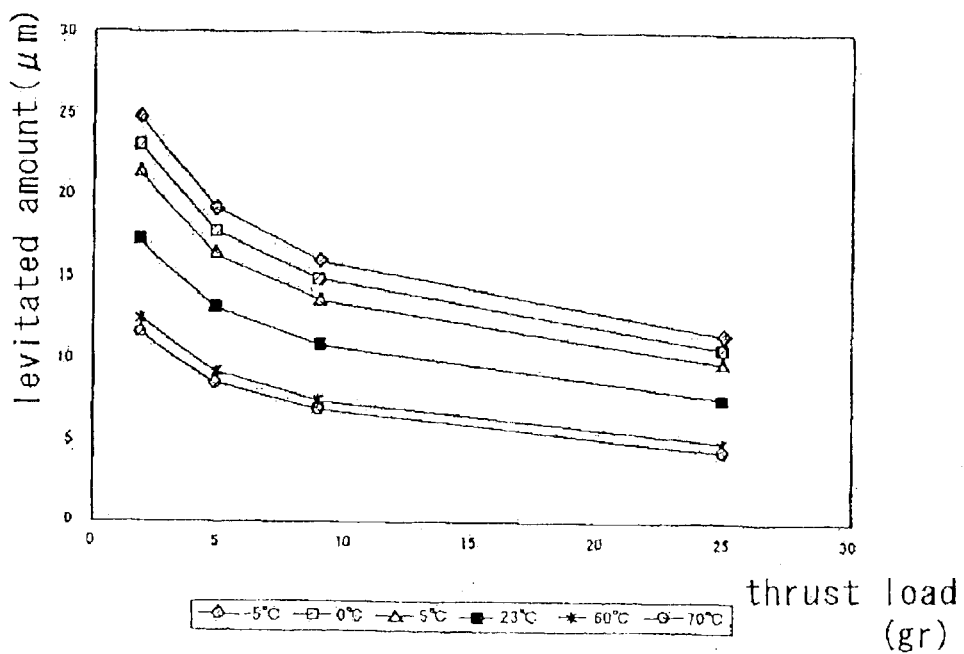

[ Fig. 8 ]
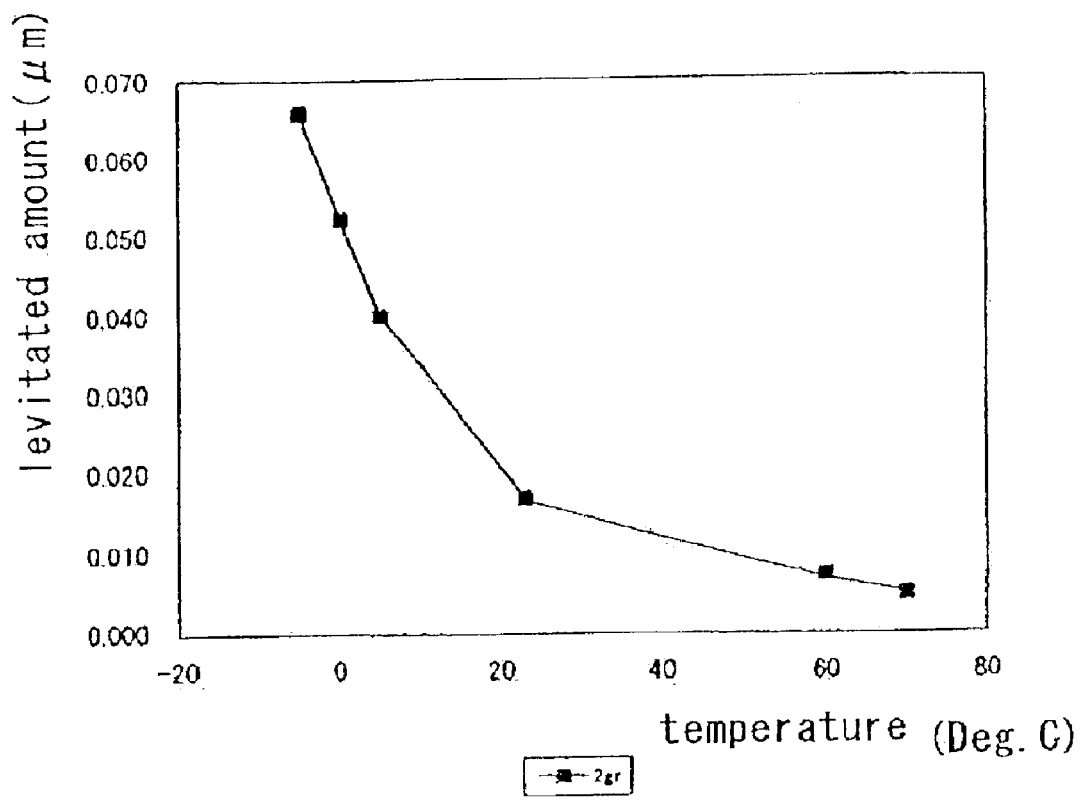

DYNAMIC PRESSURE BEARING DEVICE

BACKGROUND OF THE INVENTION

1. Field of the Invention

The present invention relates to a dynamic pressure bearing device in which one of a shaft and a bearing member is rotatably supported by the other with dynamic pressure generated by lubricating fluid.

2. Description of Related Art

In recent years, a dynamic pressure bearing device, in which a rotary shaft is supported by a dynamic pressure generated in a lubricating fluid, has been developed as a bearing device that can rotate a rotary body at a high speed and high accuracy for various kinds of rotational driving devices. In such a dynamic pressure bearing device, a bearing having a thrust bearing part SB structured as shown in FIG. 4, for example, has been proposed in order to make the entire device thinner. In the thrust bearing part SB, a rotary member (rotary hub) 3 is attached to a rotary shaft 2, which is supported in a freely rotatable manner by a dynamic pressure bearing member (bearing sleeve) 1. An inner end surface in the axial direction (under surface in FIG. 4) at the center area of the rotary member 3 is positioned opposite and in close proximity in the axial direction to an outer end surface (upper end surface in FIG. 4) of the dynamic pressure bearing member 1, thereby forming the thrust bearing part SB at the thrust opposing area.

In the interior of the thrust dynamic pressure bearing part SB, a lubricating fluid is filled and spiral-shaped dynamic pressure generating grooves, for example, are formed in the circumferential direction as a dynamic pressure generating means for the lubricating fluid, so that the pressurizing effect of the dynamic pressure generating grooves causes dynamic pressure to be generated in the lubricating fluid and thereby yields a predetermined levitation force in the axial direction.

Also, two radial bearing parts RB and RB are formed in the axial direction at a radial opposing region which is formed by opposing an inner circumference surface of the dynamic pressure bearing member 1 to an outer circumference surface of the rotary shaft 2. A lubricating fluid is filled in a bearing space for each of the radial dynamic pressure bearing parts RB continuously from the thrust dynamic pressure bearing part SB. As a dynamic pressure generating means for the lubricating fluid, for example, herringbone-shaped dynamic pressure generating grooves are provided in the circumferential direction, and dynamic pressure is generated to the lubricating fluid by means of a pressurizing effect of the dynamic pressure generating grooves to obtain a radial levitating force.

In the dynamic pressure bearing device, the bearing space is formed in a continuous manner from the two radial bearing parts RB and RB to the thrust dynamic pressure bearing part SB, and the lubricating fluid is continuously filled in the continuous bearing space.

In such dynamic pressure bearing devices, the groove shape (groove length) of the dynamic pressure generating grooves provided on the radial bearing part RB sometimes becomes unbalanced in the axial direction due to processing errors at the time of manufacturing. As a result, for example, as shown with the lengths of the arrows in the lower radial bearing part RB in FIG. 5, the pumping effect forces P1 and P2 to become in an unbalanced state (for example, P1>P2) in the axial direction. That causes to affect the thrust levitated amount in the thrust dynamic pressure bearing part SB.

The variation of the levitated amount in the thrust direction due to the unbalance in the radial bearing part RB is generally proportional to the variation of the viscosity of the lubricating fluid. As shown in FIG. 6, for example, the variation of the levitated amount in the thrust direction (vertical axis) with respect to the temperature variation (horizontal axis) becomes larger at a region on a lower temperature side. FIG. 6 shows a graph in which the weight (g) of the rotary body is a parameter, and it is understood that the variation of the thrust levitated amount is easy to be affected particularly in small and lightweight rotational driving devices, which has a light-weight rotary body. More specifically, as shown in FIGS. 7 and 8, the tilt of the variation curve of the thrust levitated amount (vertical axis) of the rotary body becomes larger as the weight of the rotary body (horizontal axis) becomes smaller and the thrust levitated amount becomes sharply larger particularly as the temperature becomes lower.

The variation of the levitated amount in the thrust direction due to the unbalance in the radial bearing part RB has caused a significant problem for rotational driving devices that drive a smaller and lighter rotary body with a small-sized spindle motor in recent years. For example, in a hard disk drive device (HDD) which drives a hard disk for information recording, a head may experience an impact on the hard disk especially under cold temperatures.

It is conceivable that the variation of the thrust levitated amount in the dynamic pressure bearing device is suppressed by means of a magnetic attracting means by use of a permanent magnet or the like. However, when the magnetic attracting force is too strong, the minimum speed required to levitate in the thrust direction increases, and the time period when the rotary body is sliding on the dynamic pressure bearing member is increased at the time of starting or stopping. Therefore, wear of the dynamic pressure bearing member is rapidly generated to cause poor rotation. Also, when the unbalanced quantity of the radial bearing part RB is large, there may be a possibility that the thrust levitation in the thrust bearing part SB is not obtained at all.

SUMMARY OF THE INVENTION

In view of the problems described above, it is an advantage of the present invention to provide a dynamic pressure bearing device capable of preventing a levitation amount in the thrust direction from be affected due to an unbalance.

In order to achieve the above advantage, according to the present invention, there is provided a dynamic pressure bearing device including a bypass passage for pressure release for communicating between a space, which is positioned between one of two radial dynamic pressure bearing parts and a thrust dynamic pressure bearing part, and a space positioned outer side in the axial direction of the other radial bearing part. The bypass passage for pressure release is separately formed from the bearing space including two radial dynamic pressure bearing parts and a thrust dynamic pressure bearing part.

According to the dynamic pressure bearing device having such a constitution, even though, for example, the groove shape (groove length) of the dynamic pressure generating grooves provided on the radial bearing parts is formed in an unbalanced state, the lubricating fluid corresponding to the amount of the unbalance, caused by the unbalance of the pumping effect forces, flows from a high-pressure side to a low-pressure side through the bypass passage for pressure release to reduce the unbalance. Accordingly, the unbalanced state in the radial bearing part does not affect the thrust bearing part and the variation of the elevated amount in the thrust direction in the thrust bearing part is prevented.

In the dynamic pressure bearing device in accordance with the embodiment of the present invention, the bypass passage for pressure release may be easily constituted by forming in either a dynamic pressure bearing member or a shaft in the axial direction.

Preferably, in the dynamic pressure bearing device in accordance with the embodiment of the present invention, an enlarged gap part is provided on the end surface of the bearing member at a position on an inner side in the radial direction of the thrust bearing part in such a manner that its gap width in the axial direction is formed larger than that in the thrust bearing part SB. The bypass passage for pressure release is arranged to open at the enlarged gap part. According to the embodiment of the present invention, the flowing of the lubricating fluid can be more smoothly conducted in the bypass passage and the enlarged gap part.

Preferably, in the dynamic pressure bearing device in accordance with the embodiment of the present invention, the bypass passage for pressure release is provided with a through-hole, which is opened at a position between two radial bearing parts. When such a through-hole is provided, the flowing of the lubricating fluid can be more smoothly conducted by using the bypass passage for pressure release.

Other features and advantages of the invention will be apparent from the following detailed description, taken in conjunction with the accompanying drawings that illustrate, by way of example, various features of the embodiments of the invention.

BRIEF DESCRIPTION OF DRAWINGS

FIG. 1 schematically shows a longitudinal cross section of a shaft rotation-type HDD spindle motor with a dynamic pressure bearing device in accordance with an embodiment of the present invention.

FIG. 2 shows an enlarged longitudinal cross section of the dynamic pressure bearing device used in the HDD spindle motor shown in FIG. 1.

FIG. 3 shows an enlarged longitudinal cross section of a dynamic pressure bearing device in accordance with another embodiment of the present invention.

FIG. 4 shows a longitudinal cross sectional explanatory view of the structure and pumping effect forces in a conventional dynamic pressure bearing device.

FIG. 5 shows a longitudinal cross sectional explanatory view illustrating an unbalanced state of the pumping effect forces in the radial bearing part of the dynamic pressure bearing device shown in FIG. 4.

FIG. 6 shows a graph indicating the relationship between temperature and the levitated amount in the thrust bearing part.

FIG. 7 shows a graph indicating the relationship between thrust load and the levitated amount in the thrust bearing part.

FIG. 8 shows a graph indicating the relationship between temperature and the levitated amount in the thrust bearing part due to the unbalance in the radial bearing part.

DETAILED DESCRIPTION OF THE PREFERRED EMBODIMENTS

Preferred embodiments of the present invention will be described in detail below with reference to the accompanying drawings. A description will be made first as to an overview of a hard disk drive device (HDD) as an example to which a dynamic pressure bearing device according to the present invention is applied.

The overall view of a shaft rotation type HDD device shown in FIG. 1 includes a stator assembly 10, which is a fixed member, and a rotor assembly 20, which is a rotary member assembled onto the top of the stator assembly 10. The stator assembly 10 has a fixed frame 11, which is screwed to a fixed base omitted from drawings. The fixed frame 11 may be formed from an aluminum material to achieve a lighter weight. On the inner peripheral surface of a ring-shaped bearing holder 12 formed upright in the generally center part of the fixed frame 11 is a bearing sleeve 13, which is a fixed dynamic pressure bearing member formed in the shape of a hollow cylinder and joined to the bearing holder 12 through press fitting or shrink fitting. The bearing sleeve 13 may be formed with a copper material such as phosphor bronze in order to more easily machine holes with small diameters.

A stator core 14, which consists of a laminate of electromagnetic steel plates, is mounted on the outer peripheral mounting surface of the bearing holder 12, and a drive coil 15 is wound on each salient pole part provided on the stator core 14.

A rotary shaft 21 that includes the rotor assembly 20 is inserted in a center hole provided in the bearing sleeve 13, which is the dynamic pressure bearing member, in a freely rotatable manner. This means that a dynamic pressure surface formed on an inner peripheral surface of the bearing sleeve 13 and a dynamic pressure surface formed on an outer peripheral face of the rotary shaft 21 are positioned opposite each other in the radial direction. Two radial dynamic pressure bearing parts RB and RB are formed in minuscule gap portions between them with an appropriate interval between the two radial dynamic pressure bearing parts RB and RB in the axial direction. More specifically, the dynamic pressure surface on the bearing sleeve 13 side and the dynamic pressure surface on the rotary shaft 21 side in each of the radial dynamic pressure bearing parts RB are positioned opposite to each other in a circular fashion across a minuscule gap of several micrometers ($\mu$m), and a lubricating fluid such as a lubricating oil or magnetic fluid is filled or present in a continuous manner in the axis direction in a bearing space formed by minuscule gap.

On at least one of the dynamic pressure surfaces of the bearing sleeve 13 and the rotary shaft 21 are provided herringbone-shaped radial dynamic pressure generating grooves, for example, that are concavely formed in a ring shape in two blocks separated in the axial direction. During rotation, a pumping effect of the radial dynamic pressure generating grooves pressurizes the lubricating fluid to generate dynamic pressure. Therefore, a rotary hub 22 together with the rotary shaft 21 becomes shaft-supported in the radial direction in a non-contact state with the bearing sleeve 13 due to the dynamic pressure of the lubricating fluid.

The herringbone shape of the radial dynamic pressure generating grooves in the respective radial dynamic pressure bearing parts RB is in a generally V-shape as usual, and a plurality of generally V-shaped groove portions are formed parallel in the circumferential direction. The pumping effects by the radial dynamic pressure generating grooves are set to be balanced in the axial direction in a symmetrical manner, for example, as indicated by arrows in FIG. 4.

Accordingly, in design, the balanced pumping effect in each of the radial dynamic pressure bearing parts RB does not cause the lubricating fluid to be pushed in either direction in the axial direction. However, in actual production, the groove shape (groove length) of the dynamic pressure generating grooves provided on the respective radial bearing parts RB may be formed in an unbalanced shape in the axial direction by manufacturing errors. As a result of that, the pumping effect forces in the respective radial bearing parts RB may be in an unbalance state. In order to prevent such a state in the present embodiment, a plurality of bypass passage BP for pressure release are formed in the bearing sleeve 13 at a peripherally equal interval so as to pass through the bearing sleeve 13 in the axial direction. The bypass passage BP for pressure release is described later in detail.

The rotary hub 22 that with the rotary shaft 21 includes the rotor assembly 20 is a generally cup-shaped member made of a ferritic stainless metal, and a joining hole 22a provided in the center portion of the rotary hub 22 is joined in a unitary fashion with the top end portion of the rotary shaft 21 through press fitting or shrink fitting. The rotary hub 22 has a body part 22b, which is generally cylindrically-shaped and serves to mount a recording medium disk such as a magnetic disk omitted from drawings on the outer circumference portion. The rotary hub 22 also has a disk mounting part 22c, which projects outward in the radial direction from the body part 22b to support the recording medium disk in the axial direction. The recording medium disk is fixed by a pressure, which is applied from above in the drawing with a clamp member (omitted from drawings) that is screwed on from above.

On the inner circumference surface of the body part 22b of the rotary hub 22 is mounted a ring-shaped drive magnet 22d. The inner circumference surface of the ring-shaped drive magnet 22d is positioned in a ring-shaped manner in close proximity to and opposite the outer circumference end surface of each of the salient pole parts of the stator core 14. A bottom end surface in the axial direction of the ring-shaped drive magnet 22d is positioned opposite in the axial direction to a magnetic attraction plate 23 that is attached to the fixed frame 11. The magnetic attraction force between the drive magnet 22d and the magnetic attraction plate 23 causes the entire rotary hub 22 to be attracted in the axial direction, so that a stable rotating state can be obtained.

An opening part provided at the bottom end of the bearing sleeve 13 is closed off by a cover 13a, and this prevents the lubricating fluid inside each of the radial dynamic pressure bearing parts RB from leaking outside.

A top end surface of the bearing sleeve 13 and a bottom end surface in the center portion of the rotary hub 22 are positioned in close proximity to and opposite each other in the axial direction. A thrust opposing region between the top end surface of the bearing sleeve 13 and the bottom end surface of the rotary hub 22 is formed into a bearing space continuing from the radial bearing part RB. A thrust dynamic pressure bearing part SB is formed in the bearing space continuing from the radial bearing part RB. In other words, on at least one of the opposing dynamic pressure surfaces 13 and 22 that includes the thrust opposing region are formed thrust dynamic pressure generating grooves in a spiral or herringbone shape, and opposing portions in the axial direction that include the thrust dynamic pressure generating grooves includes the thrust dynamic pressure bearing part SB.

The dynamic pressure surface on the top end surface of the bearing sleeve 13 and the opposing dynamic pressure surface in close proximity on the under surface of the rotary hub 22, where the two dynamic pressure surfaces include the thrust dynamic pressure bearing part SB, are positioned opposite to each other in the axial direction across a minuscule gap of several micrometers ($\mu$m). The lubricating fluid such as oil, magnetic fluid or the like is filled continuously from the radial dynamic pressure bearing parts RB into the bearing space including the minuscule gap. During rotation, a pumping effect of the thrust dynamic pressure generating grooves pressurizes the lubricating fluid to generate dynamic pressure and the dynamic pressure of the lubricating fluid causes the rotary shaft 21 and the rotary hub 22 to be supported and floated in the thrust direction and in a non-contact state.

The thrust dynamic pressure bearing part SB in the present embodiment is positioned at the outermost circumference side of the thrust opposing region between the top end surface of the bearing sleeve 13 and the bottom end surface of the rotary hub 22. At the outermost circumferential portion of the thrust opposing region, the thrust dynamic pressure bearing part SB also serves as a pumping means that pressurizes inward in the radial direction the lubricating fluid that is present throughout the thrust opposing region including the thrust dynamic pressure bearing part SB.

Further, on the outermost circumference face of the bearing sleeve 13, which is the dynamic pressure bearing member, is formed a fluid sealing part including a capillary sealing part 24. The capillary sealing part 24 that serves as the fluid sealing part is formed on the outer side in the radial direction adjacent to the thrust opposing region in the axial direction including the thrust dynamic pressure bearing part SB. The capillary sealing part 24 is formed by an outer circumference surface of the bearing sleeve 13 and an inner circumference surface of a counter plate 25, which serves as a pull-out stopping member, formed opposite to the outer circumference surface of the bearing sleeve 13 in the radial direction. The counter plate 25 consists of a ring-shaped member fixed to a flange part 22e provided on the rotary hub 22. A taper-shaped sealing space is formed by continuously enlarging the gap between the inner circumference surface of the counter plate 25 and the outer circumference surface of the bearing sleeve 13 towards an opening portion on a downward side in the drawing. The lubricating fluid in the thrust dynamic pressure bearing part SB is continuously filled until it reaches to the middle position of the capillary sealing part 24.

At the top end portion of the bearing sleeve 13 is provided a pull-out preventing flange part 13b that projects outward in the radial direction. A part of the pull-out preventing flange part 13b is positioned opposite to a part of the counter plate 25 in the axial direction. The pull-out preventing flange part 13b and the counter plate 25 prevent the rotary hub 22 from pulling out in the axial direction.

The plurality of bypass passages BP for pressure release provided in the bearing sleeve 13 are formed separately from the bearing space including the respective radial bearing parts RB so as to pass through the bearing sleeve 13 in the axial direction. Each of the bypass passages BP is provided with apertures BP1 and BP2 on both end surfaces in the axial direction of the bearing sleeve 13. The aperture BP2, which is provided on the top surface of the bearing sleeve 13, is positioned so as to open at a space between the thrust dynamic pressure bearing part SB and the upper side radial bearing part RB provided adjacent to the thrust dynamic pressure bearing part SB.

In other words, the aperture BP2 on the upper side of the bypass passage BP for pressure release is opened at an enlarged gap part LS formed inside in the radial direction of the thrust dynamic pressure bearing part SB in such a manner that its gap width in the axial direction is formed larger than the thrust dynamic pressure bearing part SB. Because of the arrangement of the enlarged gap part LS, the bypass passage BP for pressure release is satisfactorily communicated with the bearing space so that excellent flowing of the lubricating fluid can be conducted.

The aperture BP1 provided at the bottom end face of the bearing sleeve 13 is provided to open at an outer side space in the axial direction formed between the bottom end surface of the bearing sleeve 13 and the cover 13a.

In the present embodiment having such a structure, even though the pumping effect forces in the radial bearing part RB become in an unbalanced state like a high pressure side and a low pressure side in the axial direction due to that the groove shape (groove length) of the dynamic pressure generating grooves provided on the respective radial bearing parts RB is in an unbalanced state, the lubricating fluid corresponding to the amount of the unbalance flows from the radial bearing part RB on a high-pressure side to the radial bearing part RB on a low-pressure side through the bypass passage BP for pressure release, which communicates the two radial bearing parts RB and RB with each other, to be a balanced state in pressure between the two radial bearing parts RB and RB. As a result, the unbalanced state in the radial bearing part RB does not affect the thrust bearing part SB and the variation of the elevated amount in the thrust direction in the thrust bearing part SB is prevented.

In an embodiment shown in FIG. 3, in which the same structural member as the above-mentioned embodiment is shown with the same notational symbol, a bypass passage BP' for pressure release is formed so as to pass through the rotary shaft 21. The bypass passage BP' for pressure release in the present embodiment is formed in a generally T-shape in cross section so as to extend from the end face aperture BP'2 provided on the bottom end surface of the rotary shaft 21 to upward along the center axis of the rotary shaft 21. The bypass passage BP' is radially extended toward outside in the radial direction from the upper extended end, and an side aperture BP'1 provided at the respective extended ends is opened at an enlarged gap part LS. The enlarged gap part LS is formed between the thrust dynamic pressure bearing part SB and the upper side radial bearing part RB provided adjacent to the thrust dynamic pressure bearing part SB. Similar operations and effects as the above-mentioned embodiment can be also obtained in this embodiment.

The present invention by the inventors has been described in detail using embodiments, but the present invention is not limited to the embodiments described above and many modifications can be made without departing from the present invention.

For example, the bypass passage BP for pressure release in the respective above-mentioned embodiments may be provided with a through-hole, which is opened at a position between the two radial bearing parts RB and RB. When such a through-hole is provided, the flowing of the lubricating fluid can be more smoothly conducted through the bypass passage BP for pressure release.

In addition, although each of the embodiments described above is an application of the present invention to an HDD spindle motor, the present invention can be applied similarly to various other types of dynamic pressure bearing devices.

As described above, in a dynamic pressure bearing device according to the present invention, a bypass passage for pressure release is provided to communicate across two radial dynamic pressure bearing parts. Accordingly, even though the groove shape (groove length) of the dynamic pressure generating grooves provided on the respective radial bearing parts RB is in an unbalanced state, the lubricating fluid corresponding to the amount of the unbalance caused by the unbalance of the pumping effect forces flows from a high-pressure side to a low-pressure side through the bypass passage for pressure release to reduce the unbalance. As a result, the unbalanced state in the radial bearing part does not affect the thrust bearing part and the variation of the elevated amount in the thrust direction in the thrust bearing part is prevented. Therefore, a stable thrust levitated amount can be always attained with simple constitution and the reliability of the dynamic pressure bearing device is enhanced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A dynamic pressure bearing device comprising:
   a rotary shaft;
   a dynamic pressure bearing member for supporting the rotary shaft;
   two radial dynamic pressure bearing parts formed in an axial direction in a radial opposing region of an inner circumference surface of the dynamic pressure bearing member to an outer circumference surface of the rotary shaft;
   a thrust dynamic pressure bearing part formed in a thrust opposing region of an end surface in the axial direction of the dynamic pressure bearing member to an end surface in the axial direction of a rotary member rotating with the rotary shaft;
   a lubricating fluid continuously filled in a bearing space comprising the two radial dynamic pressure bearing parts and the thrust dynamic pressure bearing part; and
   a bypass passage for pressure release for communicating between a space, which is positioned between one of the two radial dynamic pressure bearing parts and the thrust dynamic pressure bearing part, and a space positioned on an outer side in the axial direction of the other radial dynamic pressure bearing part, retaining the lubricating fluid, communicating with the other radial dynamic pressure bearing part.

2. The dynamic pressure bearing device according to claim 1, wherein the bypass passage for pressure release is formed in the axial direction in either of the dynamic pressure bearing member or the rotary shaft.

3. The dynamic pressure bearing device according to claim 1, further comprising an enlarged gap part provided on an end surface of the bearing member at a position on an inner side in the radial direction of the thrust bearing part in such a manner that its gap width in the axial direction is formed larger than the thrust bearing part, and the bypass passage for pressure release is arranged to open at the enlarged gap part.

4. The dynamic pressure bearing device according to claim 1, wherein a dynamic pressure surface of the rotary shaft is provided with herringbone-shaped radial dynamic pressure generating grooves.

5. The dynamic pressure bearing device according to claim 4, wherein the generating grooves have a ring shape.

6. The dynamic pressure bearing device according to claim 4, wherein the generating grooves are spiral in shape.

7. A dynamic pressure bearing device comprising:
a shaft;
a bearing member;
two radial dynamic pressure bearing parts formed in an axial direction between an inner circumference surface of the bearing member and an outer circumference surface of the shaft;
a thrust dynamic pressure bearing part formed between an end surface in the axial direction of the bearing member and an end surface in the axial direction of the shaft;
a lubricating fluid continuously filled in a bearing space comprising the two radial dynamic pressure bearing parts and the thrust dynamic pressure bearing part; and
a bypass passage for pressure release for communicating between a space, which is positioned between one of the two radial dynamic pressure bearing parts and the thrust dynamic pressure bearing part, and a space positioned on an outer side in the axial direction of the other radial dynamic pressure bearing part, retaining the lubricating fluid, communicating with the other radial dynamic pressure bearing part.

8. The dynamic pressure bearing device according to claim 7, wherein the bypass passage for pressure release is formed in the axial direction in either of the bearing member or the shaft.

9. The dynamic pressure bearing device according to claim 8, further comprising an enlarged gap part provided on an end surface of the bearing member at a position on a radial dynamic pressure bearing part side of the thrust bearing part in such a manner that its gap width in the axial direction is formed larger than the thrust bearing part, and the bypass passage for pressure release is arranged to open at the enlarged gap part.

10. The dynamic pressure bearing device according to claim 7, wherein a dynamic pressure surface of the shaft is provided with herringbone-shaped radial dynamic pressure generating grooves.

11. The dynamic pressure bearing device according to claim 10, wherein the generating grooves have a ring shape.

12. The dynamic pressure bearing device according to claim 10, wherein the generating grooves are spiral in shape.

13. A dynamic pressure bearing device comprising:
a rotary shaft;
a dynamic pressure bearing member for supporting the rotary shaft;
two radial dynamic pressure bearing parts formed in an axial direction in a radial opposing region of an inner circumference surface of the dynamic pressure bearing member to an outer circumference surface of the rotary shaft;
means for pressurizing a lubricating fluid formed in a thrust opposing region of an end surface in the axial direction of the dynamic pressure bearing member to an end surface in the axial direction of a rotary member rotating with the rotary shaft;
the lubricating fluid continuously filled in a bearing space comprising the two radial dynamic pressure bearing parts and the means for pressuring; and
a bypass passage for pressure release for communicating between a space, which is positioned between one of the two radial dynamic pressure bearing parts and the means for pressurizing, and a space positioned on an outer side in the axial direction of the other radial dynamic pressure bearing part, retaining the lubricating fluid, communicating with the other radial dynamic pressure bearing part.

14. The dynamic pressure bearing device according to claim 13, wherein the bypass passage for pressure release is formed in the axial direction in either of the dynamic pressure bearing member or the rotary shaft.

15. The dynamic pressure bearing device according to claim 13, further comprising an enlarged gap part provided on an end surface of the bearing member at a position on an inner side in the radial direction of the means for pressurizing in such a manner that its gap width in the axial direction is formed larger than the means for pressurizing, and the bypass passage for pressure release is arranged to open at the enlarged gap part.

16. The dynamic pressure bearing device according to claim 13, wherein a dynamic pressure surface of the rotary shaft is provided with herringbone-shaped radial dynamic pressure generating grooves.

17. The dynamic pressure bearing device according to claim 16, wherein the generating grooves have a ring shape.

18. The dynamic pressure bearing device according to claim 16, wherein the generating grooves are spiral in shape.

* * * * *